United States Patent [19]

Smith

[11] 4,377,193

[45] Mar. 22, 1983

[54] PNEUMATIC TIRE AND METHOD FOR MAKING SAME

[75] Inventor: Grahame N. W. Smith, Silverlake, Ohio

[73] Assignee: The Goodyear Tire & Rubber Company, Akron, Ohio

[21] Appl. No.: 213,421

[22] Filed: Dec. 5, 1980

[51] Int. Cl.³ .................. B60C 15/04; B60C 15/06; B29H 17/32; B29H 5/00
[52] U.S. Cl. .................. 152/354 R; 152/362 R; 152/362 CS; 156/132; 264/501; 264/326
[58] Field of Search ................ 156/131–132; 152/354 R, 354 RB, 362 R, 362 CS; 264/501, 326

[56] References Cited

U.S. PATENT DOCUMENTS

| | | | |
|---|---|---|---|
| 1,548,370 | 8/1925 | Midgely | 152/362 R |
| 2,752,980 | 7/1956 | Riggs | 152/362 R |
| 3,111,976 | 11/1963 | Delobelle | 152/362 R |
| 3,826,297 | 7/1974 | Alderfer | 152/362 R |
| 4,029,137 | 6/1977 | Suydam | 152/362 R |

*Primary Examiner*—Edward C. Kimlin
*Assistant Examiner*—Lois E. Boland
*Attorney, Agent, or Firm*—Frank Pincelli

[57] ABSTRACT

An improved pneumatic tire and improved method for building same on a high crown building drum. The lower bead portion of the tire is provided with an additional reinforcing ply structure which is wrapped about a substantially inextensible bead wire.

An improved method of building a tire on a high crown building drum wherein the additional reinforcing ply structure in the bead area is placed in tension during vulcanization.

16 Claims, 5 Drawing Figures

PNEUMATIC TIRE AND METHOD FOR MAKING SAME

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to an improved tire and method for making a tire. In the prior art it has been found desirable to place a strip of cord reinforcing material in the lower bead portion of tire adjacent the rim flange contact area of the tire. Certain tires are preferably or are required to be built on high crown building drums. For example, large earthmover tires which have high strength beads are generally built on a high crown building drum. However, it has been found that tires built on a high crown building drum develop waviness and/or wrinkles in the reinforcing strip located at the bead region. These wrinkles or creases result in stress points which may lead to premature failure of the tire.

Applicants have discovered a novel tire construction and improved method for building same on a high crown building drum which minimizes formation of wrinkles or creases in the reinforcing strip.

DETAILED DESCRIPTION OF THE INVENTION

Figure 1:
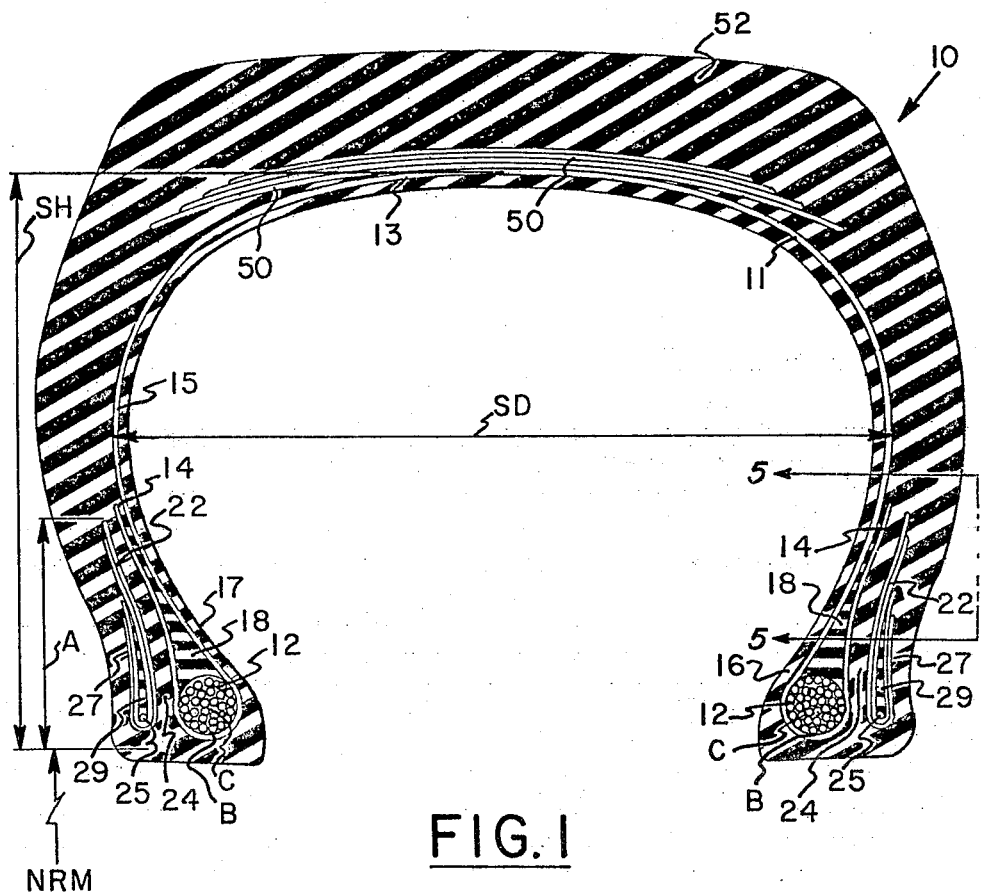
FIG. 1 is a cross-sectional view of a tire made in accordance with the present invention.

Referring to FIG. 1 there is illustrated a tire made in accordance with the present invention. The tire 10 is provided with a reinforcing carcass ply structure 11 which is wrapped about a pair of reinforcing bead cores 12. The carcass ply structure 11 having a main body portion 15 and a pair of turned up end portions 14 disposed axially outward of the main body portion 15 in the bead portions 16, 17. Placed between the main body portion 15 and each end portion 14 is an elastomeric member 18 generally referred to as an apex. In the particular embodiment illustrated, the carcass ply structure 11 comprises a single ply layer 13. However, any desired number of ply layers may be used. In the particular embodiment illustrated, the ply layer 13 of carcass structure 11 comprises a plurality of parallel cords disposed at an angle from about 75° to 90° with respect to the mid-circumferential centerplane CP of the tire. This type of construction is generally referred to as a radial ply construction. However, the cords of the ply layers of the carcass reinforcing structure may be oriented at any desired angle.

Figure 5:
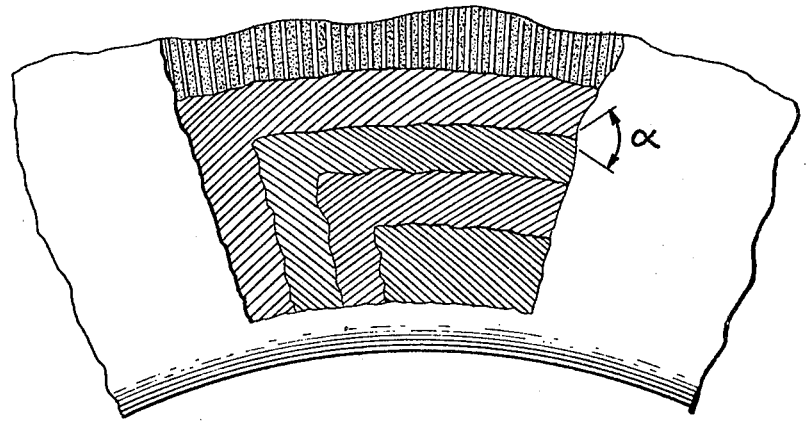
FIG. 5 is the side view of a cured tire made in accordance with the present invention partially broken away to illustrate the cord orientation of the reinforcing fabric strip.

Disposed axially outward of the reinforcing carcass structure 11 with respect to the mid-circumferential centerplane CP of the tire in each bead portion 16, 17 is a reinforcing structure 22. The reinforcing structure 22 is spaced axially from the end portion 14 by an elastomeric spacer 24. The reinforcing fabric structure 22 comprises at least one fabric strip folded about a substantially inextensible bead wire or core 25, which is disposed axially adjacent the bead core 12. In the particular embodiment illustrated, the reinforcing structure 22 comprises two reinforcing strips 27, 29 which form four layers of cord reinforcement. The cords of reinforcing strips 27, 29 may comprise any material used for rubber reinforcement. For example, and not by way of limitation, rayon, polyester, nylon, aramid, and/or fiberglass. In the particular embodiment illustrated, cords of strips 27, 29 are made of nylon and the bead core 25 comprises a single metal wire. The bead core 25 is disposed generally radially inward of the radially outermost point of the bead core 12, preferably, at the center point C. The reinforcing structure 22 extends radially outward into the sidewall of the tire 10 terminating prior to reaching the shoulder area of the tire, preferably terminating prior to reaching the maximum section width of the tire. In the embodiment illustrated, the reinforcing structure 22 terminates at a point radially outward from the nominal rim diameter a distance A of approximately 25% of the section height of the tire. For the purposes of this invention, the carcass section height SH is the distance from the nominal rim diameter of the tire to the neutral contour line of the carcass reinforcing structure at the radially outermost point of the carcass. Also for purposes of this invention, the neutral contour line of the carcass structure is located midway between the radially inner and radially outer ply layers and in the case of a single ply layer the neutral contour line is the carcass ply layer. The nominal rim diameter is the rim diameter as designated by the tire size. The cords of the reinforcing ply 22 are disposed such that the included angle $\alpha$ between adjacent plies 27, 29 as measured in the circumferential direction is preferably at least 20° and preferably no greater than 140° (see FIG. 5). In the particular embodiment illustrated, the included angle between the adjacent plies is approximately 50° in the cured state.

Figure 2:
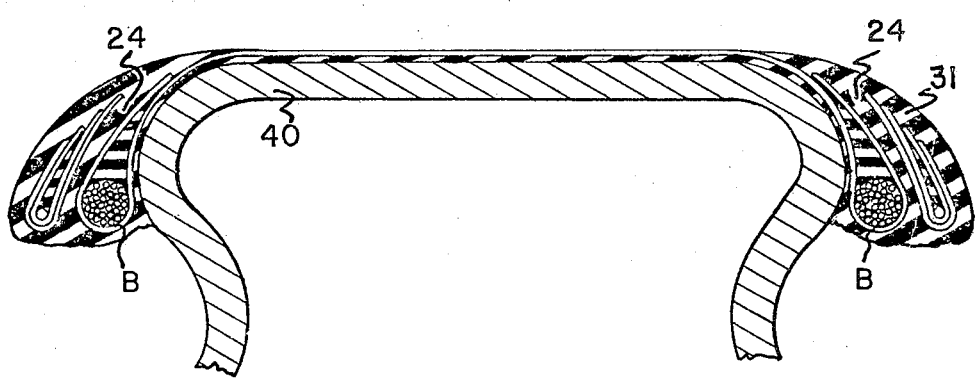
FIG. 2 is a cross-sectional view of a partially built tire in accordance with the present invention on a high crown building drum.

Referring to FIG. 2, there is illustrated a high crown building drum 40 on which the tire of the present invention is built. For the purposes of this invention, a high crown building drum shall be considered a drum in which the radially innermost point B of the bead cores of the tire when positioned on the tire building drum is located radially inward of the radially outer surface of the building drum with respect to the axis of rotation of the building drum. FIG. 2 illustrates an example of a high crown building drum.

The present invention is particularly well suited for large pneumatic tires, and in particular for large earthmover type tires which are generally required to be built on a high crown building drum. Due to the large amount of rubber in the lower sidewall regions of the tire, the possibility of wrinkles or creases being formed is greater. Additionally, large earthmover type tires generally experience large stresses in the lower sidewall portions. Accordingly, it is desirable to minimize the formation of wrinkles and/or creases.

Figure 3:
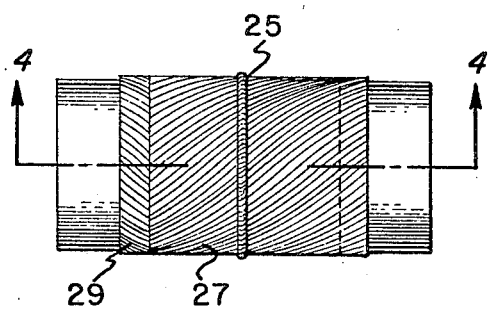
FIG. 3 is a top plan view of a reinforcing fabric strip package on a building mandrel prior to being folded.
Figure 4:
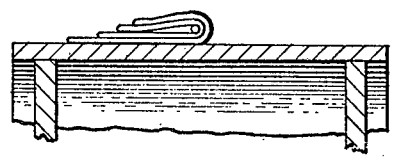
FIG. 4 is a cross-sectional view taken along lines 4—4 of FIG. 3 illustrating the reinforcing fabric strip after being folded.

The tire of the present invention is built by first applying a carcass reinforcing structure about the tire building drum 40, then locating a pair of substantially inextensible bead cores 12 in axially spaced apart relationship about the carcass structure and disposing an apex 18 adjacent each bead core 12. The lateral portions 14 of the carcass structure 11 are then folded radially outward back upon the main body portion 15 of the carcass structure 11. An elastomeric spacer 24 is provided adjacent the lateral portions 14 of carcass structure 18. However, spacer 24 may be omitted if desired. A fabric reinforcement structure 22 is then placed about each bead portion of the tire. The reinforcing structure 22 may be built on the tire building drum 40, however, because of the difficulty of folding the ply layers 27, 29 over the building drum 40, the reinforcing structure 22 is preferably built at a different location and is later applied to the building drum 40 as a single unit. Referring to FIG. 3, there is illustrated a top plan view of the reinforcing structure 22 being built on a separate building drum. Fabric layers 27, 29 are placed about the building drum. The bead core 25 is located on the building drum and the layers 27, 29 are then folded over. The assembled reinforcing structure 22 is then placed on the tire building drum 40. The elastomeric sidewall portions 31 are applied then to the building drum and the tire is then expanded to its substantially toroidal configuration as illustrated in FIG. 1.

A cord reinforcing belt structure 50 is placed about the periphery of the tire 10. The reinforcing belt structure may comprise any desired number of layers and the cords of each layer may be disposed at any desired angle and be made of any material used for rubber reinforcement. If desired, the cord reinforcing belt structure 50 may be entirely omitted. In the particular embodiment illustrated, the reinforcing belt structure 50 comprises four layers having cords made from steel.

An elastomeric tread portion 52 is then provided circumferentially about the reinforcing belt structure 50. The tire 10 is then removed from the building drum 40 and placed into a mold where it is vulcanized to its final configuration.

An important aspect of the present invention is that the reinforcing strip 22 during the vulcanization process is placed in tension. This may be accomplished by providing spacer 24 and/or sidewall structure 31 with a sufficient amount of rubber so as to cause the rubber in the lower sidewall bead region to flow radially outward during vulcanization. This causes the fabric strip 22 to be in tension as the reinforcing bead core 25 prevents the fabric strip from moving radially beyond this point. As previously stated, the additional elastomeric material may be placed in spacer 24 or sidewall portions 31 or in both. All that is required is that a sufficient amount of rubber be placed in the lower bead region so as to cause a flow of rubber radially outward.

While certain representative embodiments and details have been shown for the purposes of illustrating the invention, it will be apparent to those skilled in the art that various changes and modifications can be made therein without departing from the spirit or scope of the invention.

I claim:

1. A large pneumatic tire having a ground-engaging tread portion, a pair of bead portions said bead portions each having a substantially inextensible bead core, a pair of sidewall portions, each of said sidewall portions extending from one of said lateral ends of said tread portions radially inward terminating at one of said bead portions, respectively, a carcass reinforcing structure extending circumferentially about said tire from one of said bead portions through said sidewall portions and said tread portion terminating in the other bead portion, said carcass structure having its lateral ends wrapped about each of said bead cores respectively, characterized by a second pair of reinforcing bead cores each being disposed axially outward of each of said respective bead cores, said carcass reinforcing structure and said lateral ends of said carcass structure, a second reinforcing structure is wrapped about each of said second reinforcing bead cores and extends radially outward with respect to the axis of rotation of said tire terminating prior to reaching the maximum section width of the tire, wherein said second reinforcing structure constitutes the exclusive reinforcement wrapped around each of said second reinforcing bead cores, an elastomeric spacer is disposed between said second reinforcing structure and said lateral ends of said carcass structure, said tire having a sufficient amount of elastomeric material adjacent said second reinforcing structure such that during vulcanization of said tire said second reinforcing structures are placed in tension.

2. A pneumatic tire according to claim 1 further characterized by said tire being a large earthmover tire.

3. The invention according to claims 1 or 2 further characterized by said second reinforcing structure comprising two plies of fabric reinforcement which form four ply layers.

4. The invention according to claim 1 or 2 further characterized in that said second reinforcing structure terminates at a distance from the nominal rim diameter of approximately 25 percent of the section height of said tire.

5. The invention according to claim 1 or 2 further characterized by said second reinforcing structure having cords made of nylon.

6. The invention according to claim 1 or 2 further characterized in that the included angle between adjacent ply layers of said second reinforcing structure is at least 20° and no greater than about 140°.

7. The invention according to claim 1 or 2 further characterized by the included angle between adjacent ply layers of said second reinforcing structure being approximately 25°.

8. The invention according to claim 1 or 2 further characterized in that said second reinforcing bead cores are located radially inward of the radially outermost part of said first bead cores.

9. The invention according to claim 1 or 2 further characterized in that said second reinforcing bead cores are located at about the same radial position as the center of said first bead cores.

10. The invention according to claim 1 or 2 further characterized by said second reinforcing bead cores comprising a single metal wire.

11. The invention according to claim 1 or 2 further characterized in that said pneumatic tire is a large earthmover tire.

12. The invention according to claim 1 or 2 further characterized by a carcass structure comprising at least one layer of parallel cords, said cords being oriented at an angle in the range between 75° and 90° with respect to the mid-circumferential centerplane of said tire.

13. A method of building a tire on a high crown building drum comprising the steps of:

providing a carcass reinforcing structure about the circumference of said building drum;

providing a pair of substantially inextensible bead cores radially about said structure and adhering thereto said bead cores in axially spaced apart position;

forcing the lateral ends of said carcass reinforcing structure about said bead cores;

providing a fabric reinforcing structure adjacent each bead core, said reinforcing structure comprising of at least one cord reinforcing strip;

providing a second substantially inextensible reinforcing bead core about each of said fabric reinforcing structures;

folding the lateral ends of said fabric reinforcing structure about said second substantially inextensible bead cores;

providing an elastomeric sidewall structure about said reinforcing structure;

shaping the tire assembly to a substantial toroidal configuration;

providing an elastomeric tread structure circumferentially about the outer periphery of said tire;

vulcanizing said tire to its final configuration, said tire having a sufficient amount of elastomeric material adjacent said reinforcing structures so that during vulcanization said elastomeric material flows radially outward thereby causing said cords of said reinforcement strips to be placed in tension.

14. A method of building a tire on a high crown building drum comprising the steps of:

providing a carcass reinforcing structure about the circumference of said building drum;

providing a pair of substantially inextensible bead cores radially about said structure and adhering thereto said bead cores in axially spaced apart position;

folding the lateral ends of said reinforcing structure about said bead cores;

providing a second preassembled reinforcing structure about each of said cores, said preassembled structure comprising at least one fabric strip folded about a second inextensible bead core;

providing an elastomeric sidewall structure about said reinforcing structure;

shaping the assembly to a substantially toroidal configuration;

providing an elastomeric tread structure circumferentially about the outer periphery of said tire;

vulcanizing said tire to its final configuration, said tire having a sufficient amount of elastomeric material adjacent said reinforcing structures so that during vulcanization said elastomeric material flows radially outward thereby causing said cords of said reinforcement strips to be placed in tension.

15. The method according to claim 13 or 14 further characterized by providing a reinforcing belt structure circumferentially about said tire prior to applying said elastomeric tread structure.

16. The method according to claim 13 or 14 further characterized by providing an elastomeric spacer adjacent each of said lateral ends of said carcass reinforcing structure.

* * * * *

UNITED STATES PATENT AND TRADEMARK OFFICE
CERTIFICATE OF CORRECTION

PATENT NO. : 4,377,193
DATED : March 22, 1983
INVENTOR(S) : Grahame N. W. Smith

It is certified that error appears in the above-identified patent and that said Letters Patent are hereby corrected as shown below:

Column 5, line 7, "forcing" should be -- folding -- .

Signed and Sealed this

Twentieth Day of September 1983

[SEAL]

Attest:

Attesting Officer

GERALD J. MOSSINGHOFF

Commissioner of Patents and Trademarks